United States Patent Office 3,367,941
Patented Feb. 6, 1968

---

3,367,941
4-PYRIDYL AND 4-SUBSTITUTED PYRIDYLBI-CYCLO-[2.2.2]OCTANE-1-AMINES
Walter A. Gregory and James C. Kauer, Wilmington, Del., assignors to E. I. du Pont de Nemours and Company, Wilmington, Del., a corporation of Delaware
No Drawing. Filed June 28, 1965, Ser. No. 467,705
14 Claims. (Cl. 260—296)

---

ABSTRACT OF THE DISCLOSURE

4-pyridyl and 4-substituted pyridylbicyclo[2.2.2]-octane-1-amines and nontoxic salts thereof and their use as antidepressant agents.

---

This invention relates to substituted bicyclo-[2.2.2]octanes. More particularly this invention refers to novel 4-pyridyl and 4-substituted pyridylbicyclo[2.2.2]-octane-1-amines, and -1-amine, 1'-oxides and their use as antidepressants.

According to the present invention we have discovered a novel class of compounds which are useful in pharmaceutical applications. Particularly, they are antidepressant agents, as shown by their ability to antagonize tetrabenazine-induced sedation in mice, to potentiate the norepinephrine pressor effect in ganglion-blocked, anesthetized dogs, and to antagonize the phenethylamine pressor effect in ganglion-blocked, anesthetized dogs.

The compounds of this invention have the formulas (1) 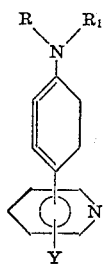

(2) 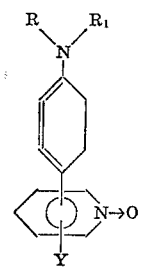

where
R and $R_1$ can be the same or different and each are hydrogen, alkyl of 1 through 4 carbon atoms or allyl; and
Y is hydrogen, methyl, ethyl, chlorine, bromine, fluorine, trifluoromethyl, hydroxy, methoxy, and ethoxy.
Also included within the scope of this invention are salts of the compounds of Formulas 1 and 2. These salts have the following formulas, (3) 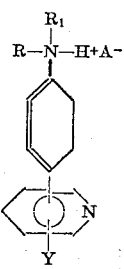

(4) 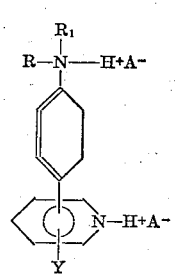

(5) 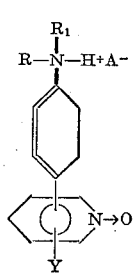

where R, $R_1$ and Y have the same meaning as above.

In the Formulae 3–5 above A is a non-toxic anion derived from acids, representative of which are hydrochloric acid, sulfuric acid, phosphoric acid, acetic acid, succinic acid, adipic acid, propionic aid, tartaric acid, citric acid, and carbonic acid. The most preferred salts for purposes of the invention are those having anions derived from hydrochloric acid, acetic acid and succinic acid.

Compounds of the present invention are particularly outstanding where R and $R_1$ are hydrogen and where Y is hydrogen. Besides hydrogen, it is preferred that Y be fluorine, trifluoromethyl or alkoxy.

The free amines of this invention are generally colorless, crystalline solids, soluble in polar organic solvents. They are moderately basic, comparing with the alkyl amines in this respect. The salts are usually colorless, high-melting, crystalline materials, very soluble in water and insoluble in organic solvents.

The compounds of this invention can be prepared as follows:

The appropriate 4 - pyridylbicyclo[2.2.2]oct-2-ene-1-carboxylic acid or ester (disclosed in copending application S.N. 460,812, filed June 2, 1965) is reduced by shaking in an atmosphere of hydrogen using a platinum catalyst. The solvent for this hydrogenation is an aqueous acid solution.

(6)
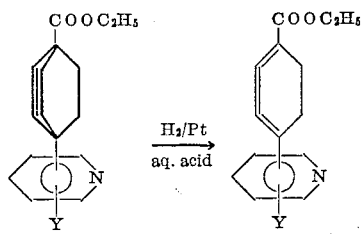

The product of this reaction, 4-pyridylbicyclo[2.2.2]octane-1-carboxylic acid ethyl ester, may be converted to the desired amine by any one of several procedures. It can be hydrolyzed to the corresponding carboxylic acid and this subjected to the Schmidt reaction with sodium azide in a mixture of concentrated sulfuric acid and chloroform or the ester may be reacted with hydrazine hydrate to give the corresponding hydrazide which then is treated with sodium nitrite in dilute acetic acid solution to give the azide, which is heated and hydrolyzed to give the amine. Alternatively, the ester may be reacted with hydroxylamine to give the corresponding hydroxamic acid, which is subjected to a Lossen rearrangement to give the appropriate amine. The ester may be reacted with ammonia to give the corresponding amide, which on treatment with a sodium hypohalite is converted to the amine. The 4-pyridylbicyclo[2.2.2]octane-1-amine may be converted to a monoalkyl or dialkyl derivative by a number of procedures. If the amine is reacted with formaldehyde and formic acid, one obtains the corresponding dimethylamino derivative.

The amine may be reacted with formic acid in the presence of acetic anhydride to give the formyl derivative which may be reduced to the monomethylamine by the use of lithium aluminum hydride. Higher alkyl derivatives may be prepared by acylation of the amino group with the appropriate acid chloride followed by lithium aluminum hydride reduction. As an alternate method of alkylation, one may treat the primary amine in an aqueous basic medium with the appropriate alkylating agent such as an alkyl halide or alkyl sulfate.

The products of this invention of Formula 1 are dibasic in character and may be converted to their mono- or diacid salts. For example, the monohydrochloride is prepared by dissolving the base in an appropriate solvent such as ethanol and adding one equivalent of dry hydrogen chloride. If two equivalents are added, a dihydrochloride is formed.

The pyridyl N-oxides of this invention may be prepared by reacting a 4-pyridylbicyclo[2.2.2]oceane-1-carboxylic acid or its ethyl ester with a per-acid such as peracetic or per-benzoic acid or with aqueous hydrogen peroxide, to give a compound having the structure:

(7)
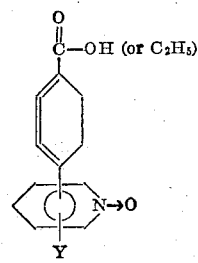

The acids are then converted to the corresponding amines through the Schmidt reaction or a modified Curtius reaction. The amines may be converted to the appropriate salt by the addition of the appropriate acid in an organic solvent such as ethanol.

Compounds of this invention may also be prepared by a series of reactions starting with the appropriate pyridyl-2-propanone. In this synthesis the pyridyl-2-propanone is condensed with 2 moles of acrylonitrile with the aid of a base such as "the basic ion exchange resin," followed by hydrolysis with aqueous base to give a 4-acetyl-4-pyridyl pivalic acid as follows:

(8)
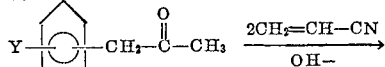
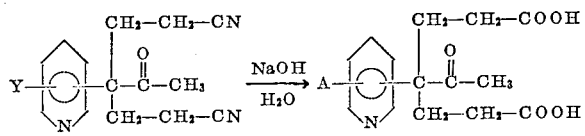

This acid is then refluxed with acetic anhydride while acetic acid is slowly taken off through a packed column until no further evolution of carbon dioxide occurs. The product of this reaction is a 4-acetyl-4-pyridylcyclohexanone.

(9)
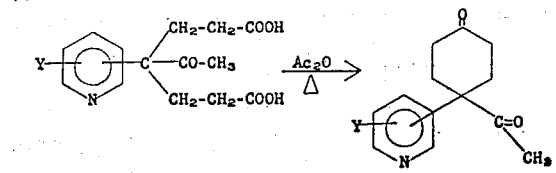

The 4-acetyl-4-pyridylcyclohexanone is cyclized to a 4-hydroxy-1-pyridylbicyclo[2.2.2]octan-2-one by reacting it with a strong base such as potassium hydroxide dissolved in absolute ethanol.

(10)
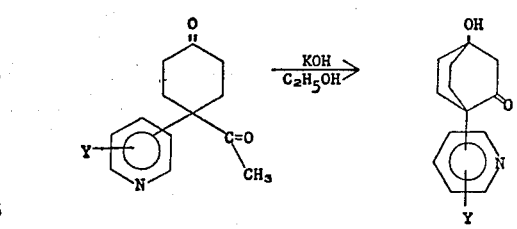

The resulting pyridyl-1-bicyclo[2.2.2]octan-4-ol-one-2 is then subjected to a Wolf-Kishner reduction which consists of forming the hydrazone by using hydrazine hydrate followed by treatment with strong base at a temperature of 120–160° C. to give a 4-pyridylbicyclo[2.2.2]octan-1-ol.

(11)
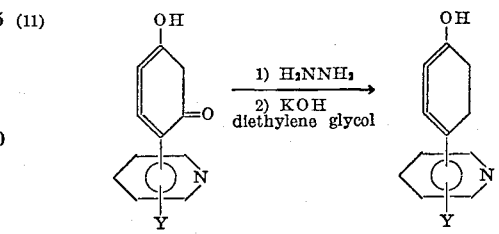

A solution of the 4-pyridylbicyclo[2.2.2]octan-1-ol in acetonitrile is formed as concentrated sulfuric acid is added. The temperature is controlled between 40–80° C. and the reaction is continued for 1–5 hrs. The resulting mixture is poured into water, whereupon the product separates as a crystalline solid. The product of this reaction is a 1-acetamido-4-pyridylbicyclo[2.2.2]octane.

In this reaction one may substitute other aliphatic nitriles or hydrogen cyanide for the acetonitrile. In this case, instead of the acetamido compound, one will obtain acylamino products corresponding to the nitrile used.

(12)

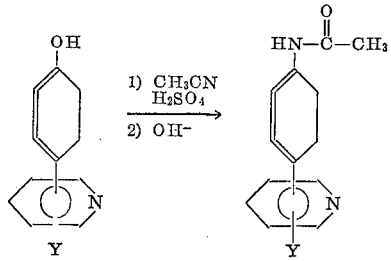

The 1-acylamido-4-pyridylbicyclo[2.2.2]octane is hydrolyzed by refluxing it with concentrated sodium hydroxide solution in water or a water-diethylene glycol mixture to give the desired 4-pyridylbicyclo[2.2.2]octane-1-amine.

(13)

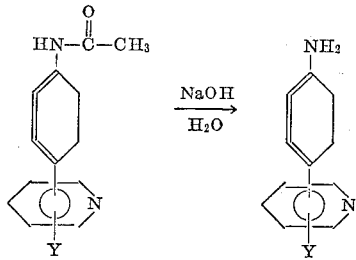

Illustrative of the compounds of this invention are the following. Nontoxic salts of these compounds are of course also contemplated:

4-(4-pyridyl)bicyclo[2.2.2]octane-1-amine
N-methyl-4(4-pyridyl)bicyclo[2.2.2]octane-1-amine
N,N-dimethyl-4-(4-pyridyl)bicyclo[2.2.2]octane-1-amine
4-(3-pyridyl)bicyclo[2.2.2]octane-1-amine
N-methyl-4-(3-pyridyl)bicyclo[2.2.2]octane-1-amine
N,N-dimethyl-4-(3-pyridyl)bicyclo[2.2.2]octane-1-amine
4(2-pyridyl)bicyclo[2.2.2]octane-1-amine
N-methyl-4-(2-pyridyl)bicyclo[2.2.2]octane-1-amine
N,N-dimethyl-4-(2-pyridyl)bicyclo[2.2.2]octane-1-amine
N-ethyl-4-(4-pyridyl)bicyclo[2.2.2]octane-1-amine
N-ethyl-N-methyl-4-(4-pyridyl)bicyclooctane-1-amine
N,N-diethyl-4-(4-pyridyl)bicyclo[2.2.2]octane-1-amine
N-propyl-4-(4-pyridyl)bicyclo[2.2.2]octane-1-amine
N-methyl-N-propyl-4-(4-pyridyl)bicyclo[2.2.2]octane-1-amine
N-ethyl-4-(3-pyridyl)bicyclo[2.2.2]octane-1-amine
N-ethyl-4-(2-pyridyl)bicyclo[2.2.2]octane-1-amine
N,N-diethyl-4-(3-pyridyl)bicyclo[2.2.2]octane-1-amine
N,N-diethyl-4-(2-pyridyl)bicyclo[2.2.2]octane-1-amine
N-ethyl-N-methyl-4-(3-pyridyl)bicyclo[2.2.2]octane-1-amine
N-ethyl-N-methyl-4-(2-pyridyl)bicyclo[2.2.2]octane-1-amine
4-(2-methyl-4-pyridyl)bicyclo[2.2.2]octane-1-amine
4-(3-methyl-4-pyridyl)bicyclo[2.2.2]octane-1-amine
4-(2-methyl-3-pyridyl)bicyclo[2.2.2]octane-1-amine
4-(4-methyl-3-pyridyl)bicyclo[2.2.2]octane-1-amine
4-(5-methyl-3-pyridyl)bicyclo[2.2.2]octane-1-amine
4-(6-methyl-3-pyridyl)bicyclo[2.2.2]octane-1-amine
4-(3-methyl-2-pyridyl)bicyclo[2.2.2]octane-1-amine
4-(4-methyl-2-pyridyl)bicyclo[2.2.2]octane-1-amine
4-(5-methyl-2-pyridyl)bicyclo[2.2.2]octane-1-amine
4-(6-methyl-2-pyridyl)bicyclo[2.2.2]octane-1-amine
4-(2-ethyl-4-pyridyl)bicyclo[2.2.2]octane-1-amine
4-(3-ethyl-4-pyridyl)bicyclo[2.2.2]octane-1-amine
4-(6-ethyl-3-pyridyl)bicyclo[2.2.2]octane-1-amine
4-(5-ethyl-2-pyridyl)bicyclo[2.2.2]octane-1-amine
4-(3-chloro-4-pyridyl)bicyclo[2.2.2]octane-1-amine
4-(5-chloro-2-pyridyl)bicyclo[2.2.2]octane-1-amine
4-(3-bromo-4-pyridyl)bicyclo[2.2.2]octane-1-amine
4-(3-fluoro-4-pyridyl)bicyclo[2.2.2]octane-1-amine
4-(3-fluoro-2-pyridyl)bicyclo[2.2.2]octane-1-amine
4-(6-fluoro-3-pyridyl)bicyclo[2.2.2]octane-1-amine
4-(3-trifluoromethyl-4-pyridyl)bicyclo[2.2.2]octane-1-amine
4-(6-trifluoromethyl-3-pyridyl)bicyclo[2.2.2]octane-1-amine
4-(6-hydroxy-3-pyridyl)bicyclo[2.2.2]octane-1-amine
4-(2-methoxy-4-pyridyl)bicyclo[2.2.2]octane-1-amine
4-(5-methoxy-2-pyridyl)bicyclo[2.2.2]octane-1-amine
4-(6-methoxy-3-pyridyl)bicyclo[2.2.2]octane-1-amine
4-(2-ethoxy-4-pyridyl)bicyclo[2.2.2]octane-1-amine
4-(3-ethoxy-4-pyridyl)bicyclo[2.2.2]octane-1-amine
4-(5-ethoxy-2-pyridyl)bicyclo[2.2.2]octane-1-amine
4-(6-ethoxy-3-pyridyl)bicyclo[2.2.2]octane-1-amine
4-(4-pyridyl)bicyclo[2.2.2]octane-1-amine,1'-oxide
N,N-dimethyl-4-(4-pyridyl)bicyclo[2.2.2]octane-1-amine,1'-oxide
4-(3-pyridyl)bicyclo[2.2.2]octane-1-amine,1'-oxide
4(2-pyridyl)bicyclo[2.2.2]octane-1-amine,1'-oxide
N-methyl-4-(2-pyridyl)bicyclo[2.2.2]octane-1-amine, 1'-oxide
N-ethyl-4-(4-pyridyl)bicyclo[2.2.2]octane-1-amine, 1'-oxide
4-(2-methyl-3-pyridyl)bicyclo[2.2.2]octane-1-amine, 1'-oxide
4-(6-methyl-3-pyridyl)bicyclo[2.2.2]octane-1-amine, 1'-oxide
4-(5-methyl-2-pyridyl)bicyclo[2.2.2]octane-1-amine, 1'-oxide
4-(3-ethyl-4-pyridyl)bicyclo[2.2.2]octane-1-amine, 1'-oxide
4-(3-fluoro-4-pyridyl)bicyclo[2.2.2]octane-1-amine, 1'-oxide
4-(3-fluoro-2-pyridyl)bicyclo[2.2.2]octane-1-amine, 1'-oxide
4-(2-methoxy-4-pyridyl)bicyclo[2.2.2]octane-1-amine, 1'-oxide
4-(5-methoxy-2-pyridyl)bicyclo[2.2.2]octane-1-amine, 1'-oxide This invention will be better understood by reference to the following illustrative examples in which parts and percentages are by weight unless otherwise indicated.

*Example 1*

A solution of 100 g. of 4-(4-pyridyl)bicyclo[2.2.2]oct-2-ene-1-carboxylic acid ethyl ester in 300 ml. of water and 100 ml. of acetic acid is shaken with 7 g. of 4% platinum on charcoal in a hydrogen atmosphere until hydrogen absorption ceases. The solution is filtered and evaporated to dryness. The residue is dissolved in water, and the solution is made basic by adding 40% aqueous sodium hydroxide. The product separates as white crystals, and is filtered and washed with water. The yield is 95 g.; M.P. 83–88° C. This product is 4-(4-pyridyl)bicyclo[2.2.2]octane-1-carboxylic acid, ethyl ester.

This ester, 90 g., is refluxed for 15 hours in 2000 ml. of 2 N sodium hydroxide. After cooling to room temperature, an equal volume of 2 N hydrochloric acid is added. The product separates as fine crystals, and is filtered and washed with water. The yield is 69 g. More material can be recovered by concentrating the filtrate. This compound, 4-(4-pyridyl)bicyclo[2.2.2]octane - 1 - carboxylic acid, is insoluble in most solvents, but will dissolve in aqueous acid or base and may be recovered by adjusting the pH to the isoelectric point.

A solution of 60 g. of the acid in 500 ml. of concentrated sulfuric acid and 800 ml. of chloroform is stirred at 40–50° C. while 30 g. of sodium azide is slowly added. The reaction is exothermic, and gas is evolved. After all of the sodium azide is added, the reaction mixture is kept at 45° C. for one hour. The mixture is cooled, poured into ice and the chloroform layer is separated and discarded. The water layer is cooled, made strongly basic, and the product is extracted with ether. The ether extract is dried with potassium hydroxide-potassium carbonate mixture. The ether is removed by vacuum evaporation to yield 4-(4-pyridyl)bicyclo[2.2.2]octane-1-amine, M.P. 84–90° C. This may be sublimed to give white crystals, M.P. 90–93° C.

To convert the amine to the dihydrochloride, it is dissolved in absolute alcohol and dry hydrogen chloride gas added until there is a slight excess. The product separates as a crystalline solid; M.P.>350° C.

Example 2

A solution of 0.10 mole of 4-(4-pyridyl)bicyclo[2.2.2]octane-1-amine in 46.3 g. (1.0 mole) of 98–100% formic acid is stirred as 20.4 g. (0.20 mole) of acetic anhydride is added, keeping the temperature between 0 and 10° C. The mixture is allowed to stand 18 hours at room temperature, and is poured onto 500 g. of ice. After the ice melts, the solution is adjusted to pH 8–9 with 50% sodium hydroxide, and the precipitate of 1-formamido-4-(4-pyridyl)bicyclo[2.2.2]octane is filtered and dried.

A 250 ml. flask with reflux condenser, drying tube and stirrer is charged with 0.10 mole of 1-formamido-4-(4-pyridyl)bicyclo[2.2.2]octane, 100 ml. of diethylene glycol dimethyl ether, and 5.7 g. (0.15 mole) of lithium aluminum hydride. The mixture is heated and stirred for 8 hours at 60° C. and for 2 hours at 120° C. After cooling, it is treated with the calculated quantities of water and 2 N sodium hydroxide to decompose the excess lithium aluminum hydride. The insoluble aluminum salts are removed by filtration and the filtrate is dried over anhydrous potassium carbonate. The dried filtrate is saturated with hydrogen chloride gas and concentrated in vacuo to give a residue of N-methyl-4-(4-pyridyl)bicyclo[2.2.2]octane-1-amine dihydrochloride.

Example 3

A solution of 0.10 mole of 4-(4-pyridyl)bicyclo[2.2.2]octane-1-amine in 75 ml. of dry pyridine is stirred while 7.85 g. (0.10 mole) of acetyl chloride is added dropwise at such a rate that the temperature does not exceed 60° C. The mixture is refluxed for ½ hour, cooled and poured into 500 ml. of cold water. The resulting precipitate is filtered, washed well with water and dried to give 1-acetamido-4-(4-pyridyl)bicyclo[2.2.2]octane.

By using 0.10 mole of 1-acetamido-4-(4-pyridyl)bicyclo[2.2.2]octane for the 1-formamido-4-(4-pyridyl)bicyclo[2.2.2]octane of Example 2, there is obtained N-ethyl-4-(4-pyridyl)bicyclo[2.2.2]octane-1-amine.

Example 4

A mixture of 0.10 mole of 4-(4-pyridyl)bicyclo[2.2.2]octane-1-amine and 0.10 mole of methyl butyrate is heated at reflux under a packed column until no more methanol can be distilled, and is then cooled. The distilling flask contents are dissolved in tetrahydrofuran and stirred as 0.10 mole of lithium aluminum hydride is added. After addition is complete, the mixture is heated at reflux for 4 hours. It is then cooled, and the excess lithium aluminum hydride is destroyed by adding a small amount of ethanol. The mixture is diluted with water, made strongly basic with 50% sodium hydroxide, and extracted with ethyl ether. The ether extract is dried wtih potassium hydroxide pellets, and the ether is removed by vacuum evaporation to yield N-butyl-4-(4-pyridyl)bicyclo[2.2.2]octane-1-amine as a residue.

Example 5

A mixture of 0.03 mole of 4-(4-pyridyl)bicyclo[2.2.2]octane-1-amine, 8 ml. of 98% formic acid and 5 ml. of 37% aqueous formaldehyde is heated at reflux on a steam bath for 15 hours. The mixture is cooled, 50 ml. of water and 25 ml. of 50% sodium hydroxide are added, with cooling, and it is extracted with three 25-ml. portions of ether. The ether extracts are combined, dried with potassium hydroxide pellets, and then treated with dry hydrogen chloride gas until precipitation is complete. The N,N-dimethyl-4-(4-pyridyl)bicyclo[2.2.2]octane-1-amine dihydrochloride is filtered and dried. More of this product can be obtained by evaporating the filtrate to dryness.

Example 6

A solution of 0.10 mole of 1-formamido-4-(4-pyridyl)bicyclo[2.2.2]octane (Example 2) in 200 ml. of anhydrous dimethyl formamide is stirred as 0.10 mole of sodium hydride is added. After hydrogen evolution ceases, 0.10 mole of allyl bromide is added slowly. The mixture is stirred at room temperature for 10 hours, and then poured into water. This mixture is made strongly basic with 50% sodium hydroxide, and extracted with three 100-ml. portions of ethyl ether. The ether extracts are combined, dried with potassium hydroxide pellets, and the ether is removed by vacuum evaporation to yield N-allyl-4-(4-pyridyl)bicyclo[2.2.2]octane-1-amine.

Example 7

A solution of 128.5 g. (0.50 mole) of 4-(3-pyridyl)bicyclo[2.2.2]oct-2-ene-1-carboxylic acid ethyl ester in 300 ml. of water and 100 ml. of acetic acid is shaken with 8 g. of 4% platinum on charcoal in a hydrogen atmosphere until no more hydrogen is absorbed. The solution is filtered, concentrated to dryness, rediluted with water, and made basic by adding 40% aqueous sodium hydroxide. This basic solution is extracted with ether and the ether extract is dried over magnesium sulfate. The ether is removed by vacuum evaporation to give 4-(3-pyridyl)bicyclo[2.2.2]octane-1-carboxylic acid ethyl ester.

An 129.5 g. (0.5 mole) amount of 4-(3-pyridyl)bicyclo[2.2.2]octane-1-carboxylic acid ethyl ester is refluxed in 2000 ml. of 2 N sodium hydroxide solution for 15 hours. After cooling to room temperature, an equal volume of 2 N hydrochloric acid is added, and the product separates as a crystalline solid. This is 4-(3-pyridyl)bicyclo[2.2.2]octane-1-carboxylic acid.

A solution of 115.5 g. (0.50 mole) of 4-(3-pyridyl)bicyclo[2.2.2]octane-1-carboxylic acid in a mixture of 1000 ml. of concentrated sulfuric acid and 1600 ml. of chloroform is stirred at 40–50° C. while 65 g. (1.0 mole) of sodium azide is added slowly. After all the sodium azide has been added, the reaction mixture is kept at 45° C. for one hour. The mixture is cooled, poured into ice and the chloroform layer is separated and discarded. The water layer is cooled and made strongly basic and the product is extracted into ether. The ether extract is dried over potassium hydroxide, filtered, and saturated with dry hydrogen chloride gas. The dihydrochloride of 4-(3-pyridyl)bicyclo[2.2.2]octane-1-amine separates as a crystalline solid.

Example 8

A solution of 128.5 g. (0.50 mole) of 4-(2-pyridyl)bicyclo[2.2.2]oct-2-ene-1-carboxylic acid ethyl ester in a mixture of 300 ml. of water and 100 ml. of acetic acid is shaken with 8 g. of 4% platinum on charcoal in a hydrogen atmosphere until no more hydrogen is absorbed. The solution is filtered, concentrated to dryness, rediluted with water, and made basic by adding 40% aqueous sodium hydroxide. This basic solution is extracted with ether and the ether extract is dried over magnesium sulfate. The ether is removed by vacuum evaporation to give 4-(2-pyridyl)bicyclo[2.2.2]octane-1-carboxylic acid ethyl ester.

An 129.5 g. (0.5 mole) amount of 4-(2-pyridyl)bicyclo[2.2.2]octane-1-carboxylic acid ethyl ester is refluxed in 2000 ml. of 2 N sodium hydroxide solution for 15 hours. After cooling to room temperature, an equal volume of 2 N hydrochloric acid is added, and the product separates as a crystalline solid. This product is 4-(2-pyridyl)bicyclo[2.2.2]octane-1-carboxylic acid.

A solution of 115.5 g. (0.50 mole) of 4-(2-pyridyl)bicyclo[2.2.2]octane-1-carboxylic acid in a mixture of 1000 ml. of concentrated sulfuric acid and 1600 ml. of chloroform is stirred at 40–50° C. while 65 g. (1.0 mole)

of sodium azide is added slowly. After all the sodium azide has been added, the reaction mixture is kept at 45° C. for one hour. The mixture is cooled, poured into ice and the chloroform layer is separated and discarded. The water layer is cooled and made strongly basic and the product is extracted into ether. The ether extract is dried over potassium hydroxide, filtered, and saturated with dry hydrogen chloride gas. The dihydrochloride of 4-(2-pyridyl)bicyclo[2.2.2]octane-1-amine separates as a crystalline solid.

*Example 9*

One-tenth mole of 4-[2-(5-ethylpyridyl)]bicyclo[2.2.2]octane-1-carboxylic acid ethyl ester is refluxed in 2000 ml. of 2 N sodium hydroxide solution for 18 hours. After cooling to room temperature, an equal volume of 2 N hydrochloric acid is added. The product separates as a crystalline solid. The crystals of 4-[2-(5-ethylpyridyl)]bicyclo[2.2.2]octane-1-carboxylic acid are filtered and dried. This acid is dissolved in 200 ml. of concentrated sulfuric acid, and 400 ml. of chloroform is added. The mixture is stirred at 40–50° C. while 17 g. of sodium azide is slowly added. The reaction mixture is kept at 45° C. for 1 hour, and is then cooled, poured into ice, and the chloroform layer is separated and discarded. The water layer is cooled, made strongly basic and the product is extracted into ether. The ether extract is dried over potassium hydroxide, filtered, and dry hydrogen chloride gas is added until no further precipitate separates. The precipitate is the dihydrochloride of 4-[2-(5-ethylpyridyl)]bicyclooctane-1-amine.

*Example 10*

One-tenth mole of 4-[5-(3-chloropyridyl)]bicyclo[2.2.2]octane-1-carboxylic acid ethyl ester is refluxed in 2000 ml. of 5 N sulfuric acid solution for 20 hours. After cooling to room temperature, an equal volume of 2 N sodium hydroxide is added. The product, 4-[5-(3-chloropyridyl)]bicyclo[2.2.2]octane-1-carboxylic acid, separates as a crystalline solid. This acid is dried and then dissolved in a mixture of 100 ml. of concentrated sulfuric acid and 150 ml. of chloroform at 40–50° C. while 20 g. of sodium azide is slowly added. Stirring is continued at 45° C. for 1 hour. The mixture is cooled, poured into ice, and the chloroform layer is separated and discarded. The water layer is cooled, made strongly basic and the product is extracted into ether. The ether extract is dried over potassium carbonate, filtered and saturated with dry hydrogen chloride gas. The crystalline dihydrochloride of 4-[5-(3-chloropyridyl)]bicyclo[2.2.2]octane-1-amine separates, and is filtered and dried.

*Examples 11–14*

The last step of Example 1 is repeated, substituting the following acids for that of the example, to obtain the products indicated.

| Ex. No. | Starting Material, Acid; Product of Example (0.50 mole) | Product |
|---|---|---|
| 11 | 4-[4-(3-fluoropyridyl)]-bicyclo[2.2.2]octane-1-carboxylic acid. | 4-[4-(3-fluoropyridyl)]-bicyclo[2.2.2]octane-1-amine dihydrochloride. |
| 12 | 4-[4-(2-trifluoromethylpyridyl)]bicyclo[2.2.2]octane-1-carboxylic acid. | 4-[4-(2-trifluoromethylpyridyl)]bicyclo[2.2.2]octane-1-amine dihydrochloride. |
| 13 | 4-[2-(3-methoxypyridyl)]-bicyclo[2.2.2]octane-1-carboxylic acid. | 4-[2-(3-methoxypyridyl)]-bicyclo[2.2.2]octane-1-amine dihydrochloride. |
| 14 | 4-[3-(5-ethoxypyridyl)]-bicyclo[2.2.2]octane-1-carboxylic acid. | 4-[3-(5-ethoxypyridyl)]-bicyclo[2.2.2]octane-1-amine dihydrochloride. |

*Example 15*

A solution of 0.10 mole of 1-formamido-4-(4-pyridyl)bicyclo[2.2.2]octane (Example 2) in acetic acid is stirred as 18 ml. of 40% peracetic acid is added. The solution becomes warm. After addition is complete, the temperature is raised to 80–90° C. for two hours. The mixture is poured into a mixture of ice and water, and sodium bicarbonate is added to bring the pH to 8. The 1-formamido-4-(4-pyridyl)bicyclo[2.2.2]octane,1'-oxide is extracted with chloroform, which is removed by vacuum evaporation.

The 1-formamido-4-(4-pyridyl)bicyclo[2.2.2]octane,1'-oxide is dissolved in 2000 ml. of 2 N sulfuric acid and heated at reflux for 20 hours. The mixture is cooled to room temperature and treated with barium hydroxide until all of the sulfate is precipitated. The barium sulfate is removed by filtration, and the filtrate is evaporated in a vacuum to yield a residue of 4-(4-pyridyl)bicyclo[2.2.2.]octane-1-amine,1'-oxide.

*Example 16*

An ethanol solution of 0.10 mole of 4-(4-pyridyl)bicyclo[2.2.2]octane-1-amine is stirred as 0.10 mole of dry hydrogen chloride dissolved in ethanol is added. The precipitate which separates is filtered, washed with ethanol, and dried. It is 4-(4-pyridyl)bicyclo[2.2.2]octane-1-amine hydrochloride.

*Example 17*

An ethanol solution of 0.10 mole of 4-(4-pyridyl)bicyclo[2.2.2]octane-1-amine is stirred and 0.10 mole of acetic acid is added. The solution is concentrated by vacuum evaporation and diluted with ethyl ether. The product crystallizes and is filtered, washed with ethyl ether and dried. It is 4-(4-pyridyl)bicyclo[2.2.2]octane-1-amine acetate.

*Example 18*

A solution of 0.10 mole of 4-(2-pyridyl)bicyclo[2.2.2]octane-1-amine (Example 5) in absolute ethanol is stirred as 0.10 mole of succinic acid is added. The solution is evaporated in a vacuum to yield the crystalline 4-(2-pyridyl)bicyclo[2.2.2.]octane-1-amine succinate.

The preceding examples can be repeated substituting equivalent amounts of appropriate starting materials to obtain other compounds of this invention including those listed hereinbefore.

The compounds of this invention can be administered for antidepressant effect according to this invention by any suitable means. For example, administration can be parenterally, that is subcutaneously, intravenously, intramuscularly, or intraperitoneally. Alternatively or concurrently, administration can be by the oral route.

The dosage administered will be dependent upon age, health and weight of the recipient, the kind of concurrent treatment if any, frequency of treatment, and the nature of the effect desired. Generally, a daily dosage of active ingredient compound will be from about 0.05 to 50 mg. per kg. of body weight, although lower, such as 0.01 mg./kg., or higher amounts can be used. Ordinarily, from 0.1 to 20 and preferably 0.1 to 5 mg./kg. per day, in one or more applications per day, is effective to obtain the desired result.

The active ingredient of this invention can be employed in useful compositions according to the present invention in such dosage forms as tablets, capsules, powder packets, or liquid solutions, suspensions, of elixirs, for oral administration or liquid solutions for parenteral use, and in certain cases, suspensions for parenteral use (except intravenous). In such compositions the active ingredient will ordinarily always be present in an amount of at least 0.20% by weight based on the total weight of the composition and not more than 99% by weight.

Besides the active ingredient of this invention the composition will contain a solid or liquid non-toxic pharmaceutical carrier for the active ingredient.

In one embodiment of a pharmaceutical composition of this invention, the solid carrier is a capsule which can be of the ordinary gelatin type. In the capsule will be from about 1–50% by weight of a compound of the invention and 99–50% of a carrier. In another embodiment, the active ingredient is tableted with or without adjuvants. In yet another embodiment, the active ingredient is put into powder packets and employed. These capsules, tablets and powders will generally constitute from about 1% to about 95% and preferably from 1% to 50% by weight. These dosage forms preferably contain from about 1 to about 500 mg. of active ingredient, with from about 1 to about 100 most preferred.

The pharmaceutical carrier can, as previously indicated, be a sterile liquid such as water and oils, including those of petroleum, animal, vegetable or synthetic origin, for example peanut oil, soybean oil, mineral oil, sesame oil, and the like. In general, water, saline, aqueous dextrose (glycose) and related sugar solutions and glycols such as propylene glycol or polyethylene glycols are preferred liquid carriers, particularly for injectable solutions. Sterile injectable solutions such as saline will ordinarily contain from about 0.05% to 10%, and preferably about 0.1 to 1% by weight of the active ingredient.

As mentioned above, oral administration can be in a suitable suspension or syrup, in which the active ingredient ordinarily will constitute from about 0.02 to 10%, and preferably about 0.1 to 1% by weight. The pharmaceutical carrier in such composition can be a watery vehicle such as an aromatic water, a syrup or a pharmaceutical mucilage.

Suitable pharmaceutical carriers are described in "Remington's Practice of Pharmacy" by E. W. Martin and E. F. Cook, a well known reference text in this field.

In addition to the exemplary illustrations above, the following examples further explain one aspect of the present invention:

*Example 19*

A large number of unit capsules are prepared for oral administration by filling standard two-piece hard gelatin capsules weighing about 30 mg. each with 5 mg. of powdered 4-(4-pyridyl)bicyclo[2.2.2]octane-1-amine dihydrochloride, 100 mg. of lactose and 0.2 mg. of "Cab-o-sil" finely divided silica.

*Example 20*

A large number of unit capsules are prepared for oral administration by filling soft gelatin capsules with a solution of 4-(4-pyridyl)bicyclo[2.2.2]octane-1-amine in mineral oil.

*Example 21*

Example 19 is repeated except that the dosage unit is 5 mg. of active ingredient, 5 mg. of gelatin, 3 mg. of magnesium stearate and 100 mg. of mannitol, mixed and formed into a tablet by a conventional tableting machine. Slow release pills or tablets can also be used, by applying appropriate coatings.

*Example 22*

A parenteral composition suitable for administration by injection is prepared by stirring 0.5% by weight of the active ingredient of Example 19 in sterile aqueous 0.9% saline.

A large variety of compositions according to this invention can thus readily be made by substituting other compounds of this invention, and including specifically but not limited to compounds of this invention that have specifically been named hereinbefore. The compounds will be used in the amounts indicated in accordance with procedures well known and described in the Martin and Cook text mentioned above.

The disclosure herein should not be taken as a recommendation to use the disclosed invention in any way without full compliance with U.S. Food and Drug laws and other laws and governmental regulations which may be applicable.

The above and similar examples can be carried out in accordance with the teachings of this invention, as will be readily understood by persons skilled in the art, by substitution of components and amounts in place of those specified. Thus, the foregoing detailed description has been given for clearness of understanding only, and no unnecessary limitations are to be understood therefrom.

The invention claimed is:
1. A compound selected from the group consisting of:
(a) compounds of the formula

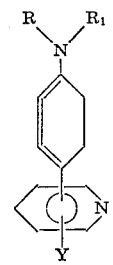

where
R and $R_1$ can be the same or different and each are hydrogen, alkyl of 1 through 4 carbon atoms or allyl; and
Y is hydrogen, methyl, ethyl, chlorine, bromine, fluorine, trifluoromethyl, hydroxy, methoxy, and ethoxy;
(b) compounds of the formula

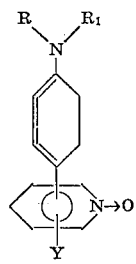

where R, $R_1$, and Y are defined as above; and
(c) non-toxic salts of the compounds of (a) and (b).
2. A compound of claim 1 wherein R, $R_1$ and Y are each hydrogen.
3. A compound of claim 1 wherein R and $R_1$ are each hydrogen and Y is fluorine.
4. A compound of claim 1 wherein R and $R_1$ are each hydrogen and Y is trifluoromethyl.
5. A compound of claim 1 wherein R and $R_1$ are each hydrogen and Y is methoxy.
6. A compound of claim 1 wherein R and $R_1$ are each hydrogen and Y is ethoxy.
7. 4-(4-pyridyl)bicyclo[2.2.2]octane-1-amine.
8. 4-(4-pyridyl)bicyclo[2.2.2]octane-1-amine-1'-oxide.
9. N-methyl - 4 - (4-pyridyl)bicyclo[2.2.2]octane - 1-amine.

10. 4-(2-pyridyl)bicyclo[2.2.2]octane-1-amine.
11. 4-(3-pyridyl)bicyclo[2.2.2]octane-1-amine.
12. 4-[4-(3-fluoropyridyl)]bicyclo[2.2.2]octane-1-amine.
13. The monohydrochloride of the compound of claim 7.
14. The dihydrochloride of the compound of claim 7.

References Cited

FOREIGN PATENTS 1,110,160 7/1961 Germany.

OTHER REFERENCES

Burger, Medicinal Chemistry, 2nd ed. Interscience, pp. 78 (1960).

Culvenor, Review of Pure and Applied Chemistry, vol. 3, No. 2, June 1953, pp. 83–86.

Yale J. of Med. and Pharm. Chem., vol. 1, No. 2 (1959), pages 121–129.

JOHN D. RANDOLPH, *Primary Examiner.*

WALTER A. MODANCE, *Examiner.*

A. L. ROTMAN, *Assistant Examiner.*